United States Patent [19]
Mulder

[11] Patent Number: 5,473,685
[45] Date of Patent: Dec. 5, 1995

[54] TELECOMMUNICATIONS END STATION WITH ELECTRICALLY CONTROLLED TERMINATING IMPEDANCE

[75] Inventor: Jacob Mulder, Eindhoven, Netherlands

[73] Assignee: U.S. Philips Corporation, Tarrytown, N.Y.

[21] Appl. No.: 93,229

[22] Filed: Jul. 16, 1993

[30] Foreign Application Priority Data

Jul. 31, 1992 [EP] European Pat. Off. ............... 92202375

[51] Int. Cl.$^6$ .................................................. H04M 1/58
[52] U.S. Cl. ...................... 379/387; 379/398; 379/400; 379/399
[58] Field of Search ................................... 379/394, 399, 379/398, 400, 404, 387

[56] References Cited

U.S. PATENT DOCUMENTS

| | | | |
|---|---|---|---|
| 4,757,530 | 7/1988 | Arnon | 379/404 |
| 4,791,668 | 12/1988 | Pringle | 379/398 |
| 4,807,283 | 2/1989 | Pyhälammi | 379/404 |
| 4,887,293 | 12/1989 | Molnar | 379/400 |
| 4,951,312 | 8/1990 | Tanikawa et al. | 379/394 |
| 4,961,219 | 10/1990 | Patel | 379/394 |
| 5,187,742 | 2/1993 | Moran, III et al. | 379/398 |
| 5,249,225 | 9/1993 | Williams | 379/398 |

FOREIGN PATENT DOCUMENTS

| | | | |
|---|---|---|---|
| 0371468 | 6/1990 | European Pat. Off. | H04M 1/58 |
| 2478412 | 9/1981 | France | H04M 1/60 |

OTHER PUBLICATIONS

"A Software Programmable CMOS Telephone Circuit", by F. Dielacher et al, IEEE Journal of Solid-State Circuits Jul. 26, 1991, No. 7, New York, pp. 1015–1026.

Philips Data Handbook "ICs for Telecom Subscriber Sets, Cordless Telephones, Mobile/Cellular Radio Pagers CA 3089 to PCD 4413."

Philips Data Handbook "ICs for Telecom Subscriber Sets Cordless Telephones, Mobiel/Cellular Radio Pagers PCD 4413A to 74HC/HCT7046A."

Primary Examiner—Jeffery A. Hofsass
Assistant Examiner—Jacques M. Saint-Surin
Attorney, Agent, or Firm—David R. Treacy

[57] ABSTRACT

The terminating impedance can be set electrically to eliminate selection and installation of discrete components in order to meet network manager specifications. A control device such as an EEPROM is easily adjusted (programmed) to control circuits presenting a predetermined specified impedance to the communications line. The impedance is preferably formed by a switched capacitor filter in which ratios of capacitance rather than absolute values are easily obtained during manufacture of an IC. The DC termination value may be set separately from the AC impedance.

15 Claims, 2 Drawing Sheets

TELECOMMUNICATIONS END STATION WITH ELECTRICALLY CONTROLLED TERMINATING IMPEDANCE

BACKGROUND OF THE INVENTION

The invention relates to an end station for wire telecommunication comprising terminals for connecting the end station to at least a two-wire line of a telecommunication network, the end station comprising a line coupling arrangement having a terminating impedance for providing a match of the end station impedance with a line impedance of the telecommunication network, and further a control arrangement for controlling the line coupling arrangement. Such end stations for speech and/or data communication may be telephone sets, apparatus for modem traffic among personal computers or telefax devices and may also be other apparatus for wire telecommunication.

An end station of this type is generally known as an electronic telephone set as described in Philips Data Handbook "ICs for Telecom Subscriber Sets, Cordless Telephones, Mobile/Cellular Radio Pagers CA3089 to PCD44 13", Data Handbooks IC03a and IC03b, 1991. On page 851 of said handbook a block diagram of such an end station is shown comprising terminals a/b, b/a for connecting the end station to a two-wire line of a telecommunication network, a telephone line. The end station comprises a line coupling arrangement in the form of a transmission circuit, for example, the IC type TEA1067, and a control arrangement in the form of a microcontroller designed for telephony purposes, for example, the IC type PCD3349. Furthermore, a representation is given of a kaypad coupled to the microcontroller and a microphone and telephone generally designed as a telephone receiver coupled to the transmission circuit. The microcontroller, a microprocessor comprising a ROM memory, RAM memory and special I/O units, produces, for example, control signals for the transmission circuit or line coupling arrangement. Page 1460 of said handbook shows a block diagram of the IC type TEA1067, a bipolar IC, and page 1476 shows the IC type TEA1067 comprising external components for connection to the public telephone network. In the application shown on page 1476 the dynamic impedance in the audio frequency range, or terminating impedance is largely determined by an external component R1, here a 620 Ω resistor, as described on page 1462.

Network managers in various countries pose different requirements as regards matching a telephone set with the telephone line. Although a 600 Ω telephone set impedance has so far been rather customary, there is now a tendency towards changing to a complex telephone set impedance satisfying the requirements of network managers. For example, the required telephone set impedance in general may be described as a unipolar complex impedance having different specified parameters for different network managers. A further tendency is to avoid using external components as much as possible when ICs are structured into an end station. Introducing large capacitances on the IC, as is generally the case with complex telephone set impedances, will cause problems. Furthermore, in an absolute sense it is impossible in practice to realize accurate impedances on an IC. When external impedances are used for obtaining a desired telephone set impedance, there is the disadvantage that the telephone set must comprise different external components for different countries, so that no flexibility is possible on the IC when the set impedance has been realized.

SUMMARY OF THE INVENTION

It is an object of the invention to provide a universal end station for wire telecommunication in which the requirements of different network managers with respect to the terminating impedance of the telephone line are satisfied in a simple manner.

An end station according to the invention is characterized in that the terminating impedance can be matched with a predetermined specified line impedance by the control arrangement. As a result, a saving on external components is realized, the manufacturing process for customizing end stations to different network managers is rendered less costly, and a faster change-over of the manufacture of end stations for a specific network manager is possible.

A preferred embodiment of an end station according to the invention is characterized in that at least part of the terminating impedance is arranged as a switched capacitor filter. Due to the resulting simple realizability of accurate impedances, integration of a matchable terminating impedance is possible. It should be borne in mind, however, that the accuracy of the impedance to be realized does not depend on absolute accuracies of magnitudes, but on the ratio of magnitudes. In view of the nature of the manufacturing processes to be used for ICs, magnitude ratios can be realized accurately.

A further embodiment of an end station according to the invention is characterized in that in a switched capacitor filter arrangement the filter is a first-order filter having a pole and a zero, whose pole can be set by a capacitance ratio between a first and a second capacitor of the filter and/or a clock rate of a filter clock. The filter behavior can thus be set over a wide range.

Another embodiment of an end station according to the invention is characterized, in that the second capacitance is formed by a plurality of switchable capacitors. By means of a control signal a desired capacitance and hence the dominant filter behavior may thus be set with these capacitors.

Still another embodiment of an end station according to the invention is characterized, in that the zero can be set by means of a resistance ratio between a first resistor and a second resistor which are coupled to the filter. As a result, a resistive part of the terminating impedance continues to be switched on if the filter clock signal drops off. If the filter were completely arranged as a switched capacitor filter, a short-circuit for the AC voltage would arise if the clock signal would drop off, which would entail too much sidetone, and further signal reception will no longer be possible.

Yet a further embodiment of an end station according to the invention is characterized, in that the control arrangement comprises a programmable read-only device in which control signals for matching the terminating impedance with the predetermined specified line impedance are stored. By including a different control code in the read-only device if the manufacturing process is to be changed to end stations for a different network manager having a different requirement with respect to terminating impedance, a manufacture switch-over is simple to realize during the programming phase of the operational read-only device.

Another embodiment of an end station according to the invention is characterized in that AC and DC matching to the line is performed separately in the line coupling arrangement. Noise analysis has shown that realizing a matching of AC impedance and DC current separately produces more favorable noise properties.

The invention will be further explained with reference to

DESCRIPTION OF THE PREFERRED EMBODIMENT

Figure 1:
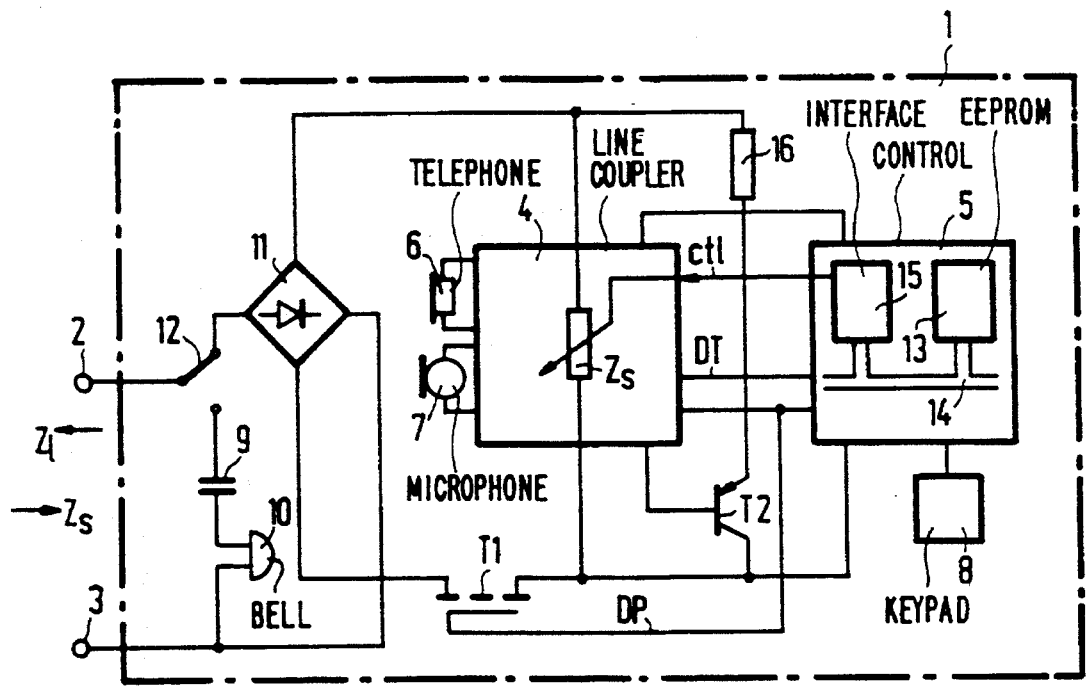
FIG. 1 schematically shows an end station for wire telecommunication according to the invention, FIG. 2 gives a further elaboration of line impedance matching according to the invention.

FIG. 1 schematically shows an end station 1 for wire telecommunication according to the invention. The end station 1 comprises terminals 2 and 3 commonly labelled a/b and b/a respectively, for connecting the end station to the telecommunication network, customarily a public telephone network. If the end station 1 is connected to the public telephone network, the end station 1 observes a line impedance $Z_l$ and the network a telephone set impedance or terminating impedance $Z_s$, shown in FIG. 1 by $Z_l \leftarrow$ and $\rightarrow Z_s$, respectively.

The end station 1 comprises a line coupling arrangement 4 and a control arrangement 5 for controlling the line coupling arrangement 4. In the case of a speech link the line coupling arrangement 4 couples a telephone 6 and a microphone 7, usually forming a whole with a telephone receiver (not shown), by way of a two-wire line to a local telephone exchange. The control arrangement 5 may be a commonly termed microcontroller specially designed for telephone purposes, i.e. the controller can convert dialling information fed by way of a keypad 8 into tones or pulses. In the case of pulse dialling the microcontroller 5 applies a control signal DP to a transistor T1 for periodically interrupting the line current and in the case of tone dialling the microcontroller 5 applies a tone signal DT to the line coupling arrangement 4. After the commonly termed dialling tone phase and connecting phase there will be a connection between a commonly termed A subscriber and a commonly termed B subscriber.

The end station also comprises a bell 10 decoupled as regards DC current by means of a capacitor 9, by which bell the subscriber may be rung for an incoming call; a diode bridge 11 to be, for example, independent of the mode of connection to the DC network, and a cradle switch 12 shown in a state in which the subscriber has taken the receiver off the hook i.e. in a state of an outgoing call.

For the B subscriber not to experience appreciable annoyance from what is commonly referred to as echoes during the connection of the B subscriber via the public telephone network, the impedance $Z_s$ of the end station 1 of the A subscriber is to be matched with the line impedance $Z_l$ in the best way possible. This similarly holds for the end station of the B subscriber. For obtaining a proper line matching, the terminating impedance is to meet the requirements (specifications) posed by a network manager. Furthermore, also the DC resistance of the end station 1 is to meet the network manager's requirements. The required terminating impedances, which may differ from one country to the other, may generally be represented as a series circuit of two resistors in which a capacitor is connected in parallel with either resistor. Either resistor may also be omitted. In its simplest form the terminating impedance is a single resistor. Therefore, the terminating impedance may, without a loss of generality, be represented in the frequency domain by a first-order function i.e. in the Laplace domain by a pole and a zero.

According to the invention the terminating impedance $Z_s$ may simply be matched with a predetermined specified impedance by means of a control signal ctl to be produced by the control arrangement 5, which signal sets the impedance $Z_s$ in accordance with a network manager's requirements. To this end the control arrangement 5 comprises, in addition to the customary arrangements (not shown here) such as a processor, RAM memory and so on, a programmable read-only device 13 coupled to a bus 14. The programmable read-only device 13 may be a commonly termed EEPROM (Electrically Erasable Programmable Read-Only Memory) in which control information for setting the terminating impedance is stored. When the end station 1 is switched on, the control signal ctl is derived from the EEPROM information by the microcontroller and transferred to the line coupling arrangement 4 via an interface 15. The interface 15 may be a buffer at whose output the setting signal ctl is available in binary form once the end station 1 has been switched on.

An embodiment of a matching of the terminating impedance according to the invention will be further explained hereinafter. FIG. 1 already shows a separate DC setting in the form of a resistor 16 and a transistor T2 which can be biased by the line coupling arrangement. Although DC setting and AC termination can be combined, it has appeared in the embodiment chosen that a separation of these functions provides better noise properties.

Figure 2:
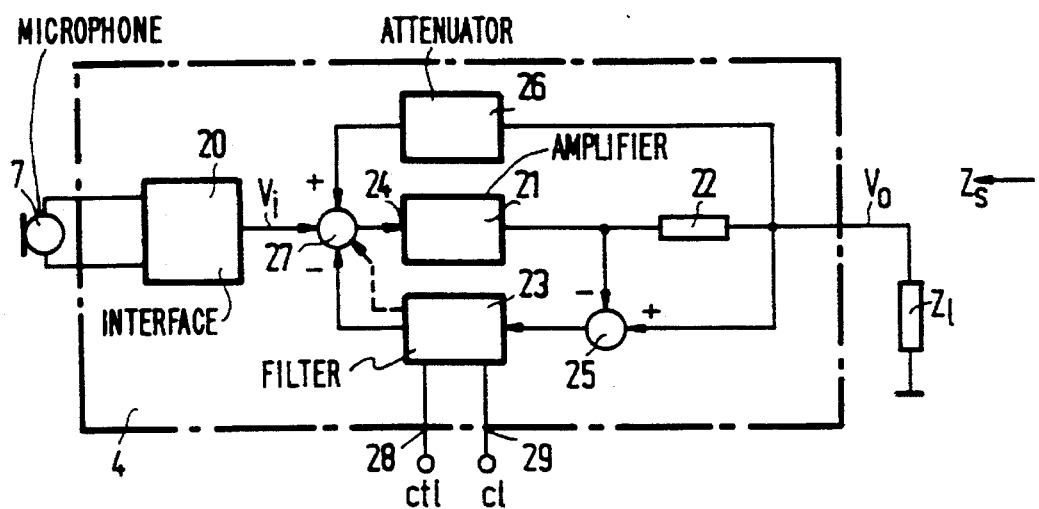

FIG. 2 shows a further elaboration of line impedance matching according to the invention, in which the line coupling arrangement 4 is shown with coupled thereto the microphone 7 and the line impedance $Z_l$. The line impedance $Z_l$ observes the terminating impedance $Z_s$ of the end station 1, represented by $Z_s \leftarrow$. Via an interface circuit 20 the microphone 7 provides voltage control $V_i$; i.e., if the terminating impedance $Z_s$ is properly matched with the line impedance $Z_l$, a flat frequency characteristic will be observed from the interface circuit 20. For forming the terminating impedance $Z_s$, an output amplifier 21 in the line coupling arrangement 4 is coupled on the output side to a high-accuracy external current measuring resistor 22 which provides power feedback to an input 24 of the amplifier 21 via a filter 23. Via difference circuit 25 the current measurement is adjusted to the filter 23. There is also a voltage feedback to the input 24 of the amplifier 21 via an attenuator 26. The signal from the microphone 7 is applied to the input 24 through a summing circuit 27. The filter 23 has a control input 28 for receiving the control signal ctl from the control arrangement 5 for the terminating impedance $Z$, to be matched.

It will be obvious that under the given circumstances for $Z_s=Z_l$, the transfer of output voltage $V_o$ to $V_i$ is frequency-independent and, in addition, that $Z_s$, except for a real ratio factor, substantially only depends on the transfer of the filter 23 in practical cases. In an embodiment of an end station according to the invention the setting of the terminating impedance $Z_s$ will thus be made on the basis of the setting of the filter 23. From an economical point of view it is necessary to manufacture an end station 1 comprising the fewest components possible i.e. the obvious way is the use of an integrated circuit. In integrated circuit technology it is practically not feasible to make large capacitors. Therefore, in an advantageous embodiment of the invention, the filter 23 is arranged as a filter having switched capacitors or switched currents. The poles and zeros in switched capacitor filters are fixed by capacitance ratios in the filter and the clock rate of the filter. Due to the fact that filter properties are fixed by capacitance ratios, no high-accuracy capacitors are required.

For a more elaborate description of filters with switched currents, reference be made to a multitude of literature, for example, the handbook "Analog MOS Integrated Circuits for Signal Processing", R. Gregorian e.a., Wiley 1986. An embodiment of the filter 23 as a switched capacitor filter may also be converted into a switched current filter. For such a conversion, reference be made to the article entitled "Switched current filters", J. B. Hughes et al., IEEE Proceedings, Vol. 137, Pt. G, No. 2, April 1990, pp. 156–162. If the filter 23 is arranged as a switched capacitor filter, the filter 23 additionally has a clock input 29 for receiving a clock signal cl. The clock signal cl whose frequency is adjustable may be supplied by the control circuit 5. Also the other components are integrated as much as possible. In the given embodiment the end station 1 functionally consists, in essence, of two integrated circuits because from OEMs there is still a demand for separate ICs for line coupling and for control purposes. Eventually, with advancing integration, the line coupling arrangement 4 and the control arrangement 5 will be integrated in a single IC.

Figure 3A:
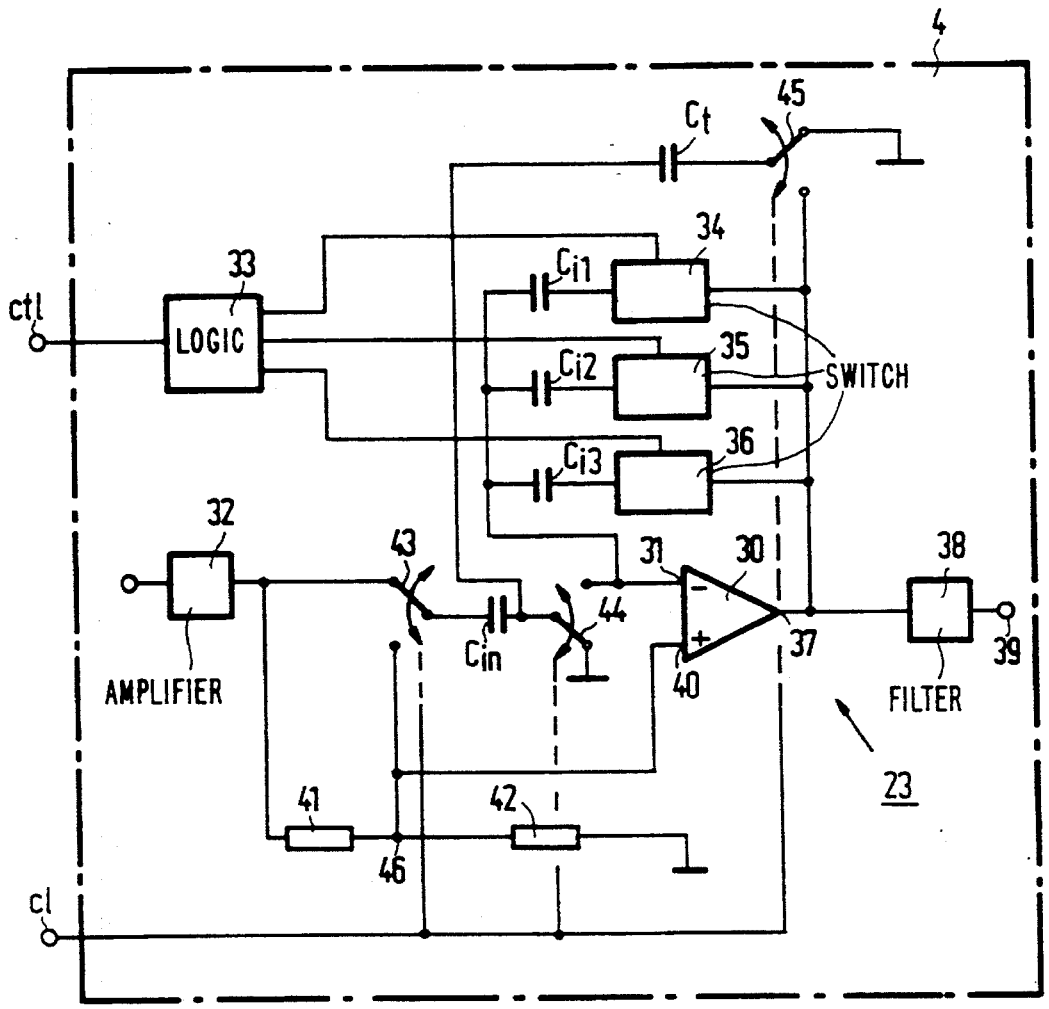
FIGS. 3A and 3B show an exemplary embodiment of line impedance matching according to the invention.
Figure 3B:
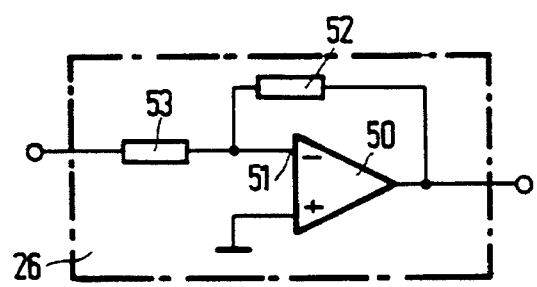

FIGS. 3A and 3B show exemplary embodiments of line impedance matching according to the invention. In the line coupling arrangement 4 a switched capacitor first-order filter is shown. The filter 23 comprises an operational amplifier 30 of which an inverting input 31 receives, via a switched input capacitor $C_m$, and via a differential amplifier 32, the output current of the amplifier 21 measured by the resistor 22 shown in FIG. 2. Furthermore, the filter 23 comprises a switched, fixed, feedback capacitor $C_f$ and a plurality of integration capacitors $C_{i1}$, $C_{i2}$ and $C_{i3}$ which can be switched on by means of multiplexing. The number of integration capacitors is not restricted to three, but extension thereof is easily possible. The integration capacitors may be switched between an output 37 of the operational amplifier 30 and the input 31 via a logic circuit 33 by switches 34, 35 and 36, for example, integrated MOSFETs. The logic circuit 33 biased by the binary control signal ctl from the control arrangement 5 produces the control signals for the switches 34, 35 and 36.

To couple the filter to the summation circuit 27 shown in FIG. 2, the output 37 is connected to a filter output 39 via an RC filter 38. The RC filter 38, which has the features of a low-pass filter, is used for filtering clock frequency components caused by switching with the clock signal cl. The first-order transfer of the filter 23 has a pole and a zero. The location of the pole is a function of the ratio between the feedback capacitor $C_f$ and the integration capacitor $C_i$, and of the clock frequency cl. The frequency behavior of the filter is thus easily adjustable.

To avoid an AC short-circuit when the clock signal drops off, a non-inverting input 40 of the operational amplifier 30 is coupled on the output side to the differential amplifier 32 via a voltage divider which comprises the resistors 41 and 42. When in operation, the clock signal cl switches the capacitors $C_m$ and $C_f$ by means of the switches 43, 44 and 45. A dropping off of the clock signal cl may switch on a resistive termination of a given value. A tapping point 46 of the resistors 41 and 42 is connected to the input 40 of the operational amplifier 30, as is shown, but may also be directly connected to the summing circuit 27. The latter is represented in FIG. 2 by way of a dashed line. Furthermore, both the input capacitor $C_{in}$ and at least either of the resistors 41 and 42 may be arranged variably and digitally adjustable, like the integration capacitor $C_i$, which is not shown here, however. As a result, also the gain of the switched capacitor filter 4, which gain is a function of the ratio between the capacitors $C_{in}$ and $C_f$, is adjustable. For moving back a zero that has been shifted as a result of the gain adjustment, the resistance of at least either resistor is varied.

FIG. 3B shows an embodiment of the attenuator 26. The attenuator 26 comprises an operational amplifier 50 with a resistance feedback on an inverting input 51. The attenuation factor is determined by the resistance ratio between the resistors 52 and 53. On the input side the attenuator 26 is coupled to the line and on the output side to the summation circuit 27, as shown in FIG. 2.

I claim:

1. An end station for wire telecommunication, comprising:

at least two terminals for connecting the end station to a line of a telecommunication network, said line having a line impedance having a predetermined specified value, a line coupling arrangement having a controllable terminating impedance which is settable to any one of a plurality of mutually different specified values, characterized in that at least part of said terminating impedance is formed by a switched capacitor filter, and an electrically controlled control arrangement for controlling the line coupling arrangement and for setting the value of said terminating impedance to a selected one of said plurality of mutually different specified values to match said predetermined specified value.

2. An end station as claimed in claim 1, characterized in that said filter is a first-order filter having a pole and a zero, the pole being set by a capacitance ratio between a first capacitor and a second capacitor.

3. An end station as claimed in claim 2, characterized in that said second capacitor is formed by a plurality of switchable capacitors.

4. An end station as claimed in claim 3, characterized in that said zero is set by controlling a resistance ratio between a first resistor and a second resistor.

5. An end station as claimed in claim 1, characterized in that said filter is a first-order filter having a pole and a zero, the pole being set by controlling the clock rate of a filter clock.

6. An end station as claimed in claim 5, characterized in that said zero is set by controlling a resistance ratio between a first resistor and a second resistor.

7. An end station as claimed in claim 1, characterized in that said control arrangement comprises an electrically programmable read-only device having stored therein control signals for matching the terminating impedance to the predetermined specified line impedance.

8. An end station for wire telecommunication, comprising:

at least two terminals for connecting the end station to a line of a telecommunication network, said line having a line impedance specified to be a predetermined specified value, a line coupling arrangement having a controllable terminating impedance, said controllable terminating impedance comprising a controllable DC setting circuit which is settable to any one of a plurality of mutually different specified DC values and a separate controllable AC impedance which is settable to any one of a plurality of mutually different specified AC values, and an electrically controlled control arrangement for controlling the line coupling arrangement and for setting the value of said controllable DC setting circuit to a selected one of said plurality of mutually different specified DC values and setting the value of said separate controllable AC impedance to a selected one of said plurality of mutually different specified AC values, to match said predetermined specified value.

9. An end station as claimed in claim 8, characterized in that at least part of said terminating impedance is formed by a switched capacitor filter.

10. An end station as claimed in claim 9, characterized in that said filter is a first-order filter having a pole and a zero, the pole being set by a capacitance ratio between a first capacitor and a second capacitor.

11. An end station as claimed in claim 10, characterized in that said second capacitor is formed by a plurality of switchable capacitors.

12. An end station as claimed in claim 11, characterized in that said zero is set by controlling a resistance ratio between a first resistor and a second resistor.

13. An end station as claimed in claim 9, characterized in that said filter is a first-order filter having a pole and a zero, the pole being set by controlling the clock rate of a filter clock.

14. An end station as claimed in claim 13, characterized in that said zero is set by controlling a resistance ratio between a first resistor and a second resistor.

15. An end station as claimed in claim 8, characterized in that said control arrangement comprises an electrically programmable read-only device having stored therein control signals for matching the terminating impedance to the predetermined specified line impedance.

\* \* \* \* \*